(12) United States Patent
Nader

(10) Patent No.: US 8,285,288 B2
(45) Date of Patent: Oct. 9, 2012

(54) COMPENSATION FOR POOR COVERAGE

(75) Inventor: Ali Nader, Malmö (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 980 days.

(21) Appl. No.: 11/911,000

(22) PCT Filed: May 2, 2006

(86) PCT No.: PCT/EP2006/004071
§ 371 (c)(1), (2), (4) Date: May 16, 2008

(87) PCT Pub. No.: WO2006/117175
PCT Pub. Date: Nov. 9, 2006

(65) Prior Publication Data
US 2009/0117892 A1    May 7, 2009

Related U.S. Application Data

(60) Provisional application No. 60/679,836, filed on May 11, 2005.

(30) Foreign Application Priority Data

May 4, 2005 (EP) .................................. 05009765

(51) Int. Cl.
*H04W 36/00* (2009.01)
*H04W 24/00* (2009.01)
(52) U.S. Cl. ................... 455/437; 455/436; 455/424
(58) Field of Classification Search .......... 455/437, 455/424, 436, 414.2, 432, 442, 456.1, 423, 455/434, 552; 702/189
See application file for complete search history.

(56) References Cited

U.S. PATENT DOCUMENTS

| | | | |
|---|---|---|---|
| 7,206,573 B1 * | 4/2007 | Weaver et al. | 455/423 |
| 7,489,928 B2 * | 2/2009 | Smith | 455/432.1 |

(Continued)

FOREIGN PATENT DOCUMENTS

EP    1 463 347 A1    9/2004

(Continued)

OTHER PUBLICATIONS

PCT International Search Report, mailed Oct. 18, 2006, in connection with International Application No. PCT/EP2006/004071.

(Continued)

*Primary Examiner* — Kent Chang
*Assistant Examiner* — Kuo Woo
(74) *Attorney, Agent, or Firm* — Potomac Patent Group PLLC

(57) ABSTRACT

A method of operating a user equipment, UE, intended to use a service in a wireless communication system having several base stations. The location of the UE is monitored, by the UE, for example with a GPS system or identification of the cell of the corresponding base station. If a problem, such as loss of coverage or call, is imminent or has occurred, information about the location is stored in a memory of the UE. After successful recovery from the problem, the alternative base station used is also stored in the memory. Next time the same location and problem is encountered, the UE uses the previous information for alleviating the problem or perform as fast recovery as possible. In this way, the UE can be operated with less frequent base station searches thereby saving battery, while at the same time sufficient coverage may be obtained.

22 Claims, 4 Drawing Sheets

U.S. PATENT DOCUMENTS

| | | | |
|---|---|---|---|
| 2001/0016489 A1 | 8/2001 | Haymes et al. | |
| 2002/0155815 A1 | 10/2002 | Richter | |
| 2002/0183061 A1* | 12/2002 | Moore | 455/434 |
| 2002/0187792 A1 | 12/2002 | Kato et al. | |
| 2003/0061009 A1* | 3/2003 | Davis et al. | 702/189 |
| 2003/0220116 A1* | 11/2003 | Sagefalk et al. | 455/456.1 |

FOREIGN PATENT DOCUMENTS

| | | |
|---|---|---|
| WO | 2004/068776 A2 | 8/2004 |

OTHER PUBLICATIONS

PCT International Preliminary Report on Patentability, mailed May 24, 2007, in connection with International Application No. PCT/EP2006/004071.

Japanese Office Action, dated Jul. 12, 2011, in connection with Japanese Application No. 2008-509358.

Japanese Office Action, dated Jul. 12, 2011, in connection with Japanese Application No. 2008-509358 (Translation).

* cited by examiner

COMPENSATION FOR POOR COVERAGE

CROSS-REFERENCE TO RELATED APPLICATIONS

This application claims priority under 35 U.S.C. §119 to European Patent Application No. 05009765.8 filed May 4, 2005, which is hereby incorporated herein by reference in its entirety. This application also claims the benefit of U.S. Provisional Application No. 60/679,836, filed May 11, 2005, which is hereby incorporated herein by reference in its entirety.

AREA OF INVENTION

The present invention relates to smooth communication with mobile telephones and more particular to improved recovery from loss of coverage.

BACKGROUND OF INVENTION

Mobile telephones communicate wirelessly with an unmovable system comprising base stations. The base stations, BS, are arranged so that each BS covers a cell area and the cells are arranged so that they cover a complete area, where service should be provided. The covered area is aimed to be continuous so that the user equipment, UE, can move within the area without losing connection to a BS. When the UE moves from one cell area to another, communication moves from one BS to another BS in the new cell area.

The UE maintains information about BSs and cells in the neighborhood by scanning the radio channels. Each BS may broadcast a pilot signal and the UE determines if the signal strength is sufficiently large for communication according to any criterion.

The UE is normally operated by batteries having a limited capacity and scanning for neighboring BSs consumes such battery power. Thus, there is a tradeoff between how often a search should be performed for updating the BS information in the UE and the standby time of the UE between battery charging (or exchange thereof).

EP 1 463 347 discloses a method of network acquisition in which information about the cell, which was camped on when the UE was switched off, is stored in a memory of the UE. When the UE is switched on, it is likely that it is switched on at a place within the coverage of a cell in which it was previously switched off. By initially scanning the cells stored in the memory, the UE will often obtain cell camping faster. If only a small number, such as 20, of such cells, in which the UE has been switched off, is stored, the initial scanning will be fast. If no coverage is found, a complete scan is performed. If the UE loses coverage, information on that cell is also stored as if the UE was switched off.

SUMMARY OF THE INVENTION

An object of the present invention is to use information about dropped calls or lost coverage or service without completely losing a call, for the purpose of reducing the risk of dropping a call or losing coverage, at the place of the UE. The UE is aware of which routes the UE normally passes and possible problems at such routes. By using this information in an intelligent way by the UE itself, advantages may be obtained.

According to a first aspect of the invention, there is provided a method of operating a user equipment intended to use a service in a wireless communication system having several base stations. The method comprises monitoring, by said user equipment, a location of said user equipment; and monitoring, by said user equipment, if a problem occurs or is imminent and storing information about the location of the user equipment at which said problem occurs in a memory of user equipment. The method may further comprise storing in said memory a base station identity and/or an operator identity when said problem occurs. The method may further comprise searching for and storing in said memory at least one alternative base station for providing said service when a problem occurs. The method may further comprise trying to camp on a base station stored in said memory and storing in said memory information if the camp attempt was successful for alleviating the problem.

In an embodiment, the method further comprises when entering an area, retrieving information from the memory about any location within said area, which has been exposed to a problem. The information retrieved from the memory may comprise whether there is no alternative base stations stored in the memory, and if that was the case, performing a new search for alternative base stations. Alternatively, or in addition, whenever a new area is entered, it is determined if any location within the area has been involved in a problem and if information about alternative base stations, successful or not, is stored in the memory; if both of these are the case, starting a search for new alternative base stations before a problem occurs or is imminent. Alternatively, whenever a new area is entered, it is determined if any location within the area has been involved in a problem and if information about successful alternative base stations is stored in the memory; if both of these are the case, not starting a search, rather using existing alternative base stations when a problem occurs.

In a further embodiment, at exit from a base station, it is determined if a location covered by the base station has been involved in a problem and if the base station is not exited because of a problem; if both of these are the case, removing the information about this base station in the memory. Alternatively, at exit from a base station, it is determined if a location covered by the base station has been involved in a problem and if the base station is not exited because of a problem; if both of these are the case, decreasing a counter, and if the counter is zero, removing the information about this base station in the memory. The counter may be set to a predetermined number when determining that the cell is problematic. In addition, if a location has not been involved in a problem for a predetermined period of time, such as a week or a month, the information about this base station in the memory is removed.

In a yet further embodiment, the location may be determined by a positioning system, such as a global positioning system, such as GPS, or a geometric positioning system, such as Geometrix.

In another aspect, there is provided a program product embodied on a computer readable medium, comprising program code, which when executed on a computer performs one or several of the method steps mentioned above.

In a further aspect, there is provided an apparatus included in a user equipment for operating said user equipment to use a service in a wireless communication system having several base stations, essentially as mentioned above.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Further objects, features and advantages will appear from the following description of several embodiments of the invention with reference to the appended drawings, in which.

DETAILED DESCRIPTION OF EMBODIMENTS

Figure 1:
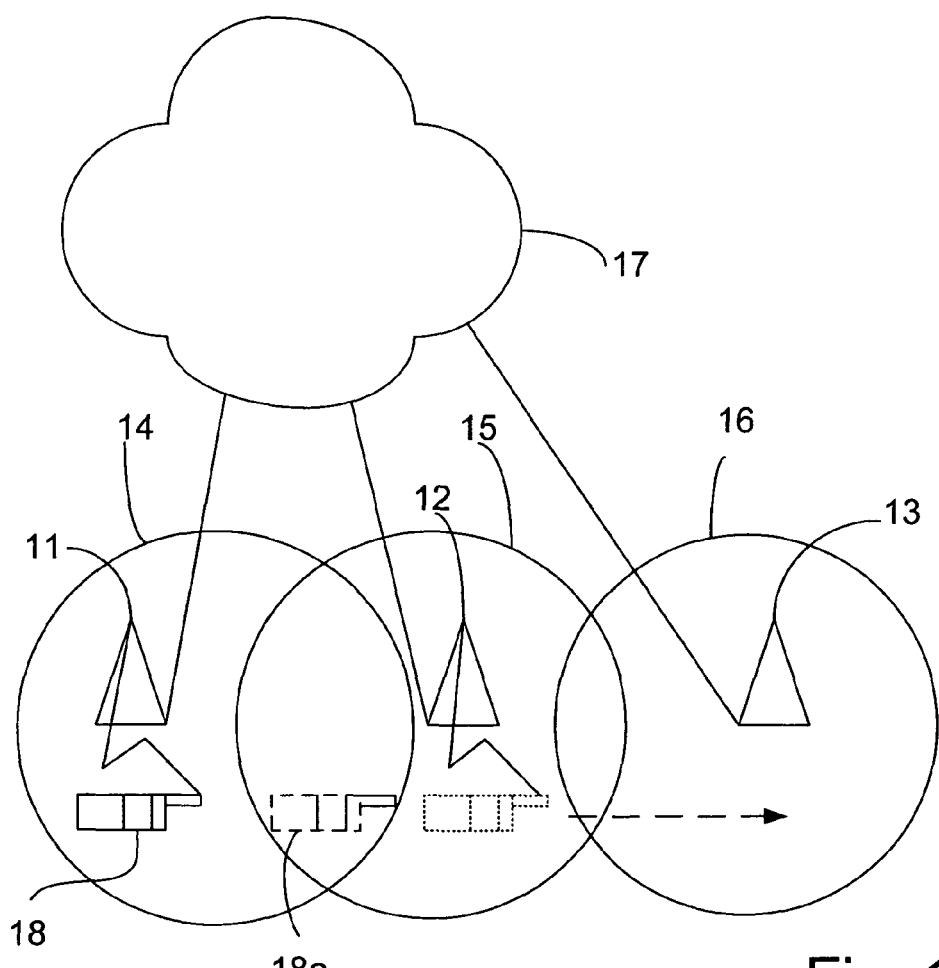
FIG. 1 is a schematic diagram of a user equipment, UE, and a network in which the UE is operating.

FIG. 1 discloses a wireless communication network of the type in which the present invention may be practiced. The network may be of the types GSM, GPRS, UMTS etc. The network may comprise several systems such as 2G and 3G. Several of these network systems may be overlapping, fully or partly.

The network comprises several base stations BS 11, 12, 13 each having a cell coverage area indicated by the circles 14, 15, 16. Each BS 11, 12, 13 is connected to a network symbolized by a cloud 17. The network may comprise different structures and communication properties as are well known in the art.

Several user equipments UEs may communicate with a base station 11, 12, 13 provided the UE is within the cell coverage area of the BS. Thus, UE 18 may communicate with BS 11, since UE 18 is within the cell coverage area 14 of BS 11. The BS may broadcast a pilot signal, which is received by the UE. Based on the pilot signal, the UE determines if the pilot signal is of sufficient strength and quality for communication, according to any criteria.

Figure 2:
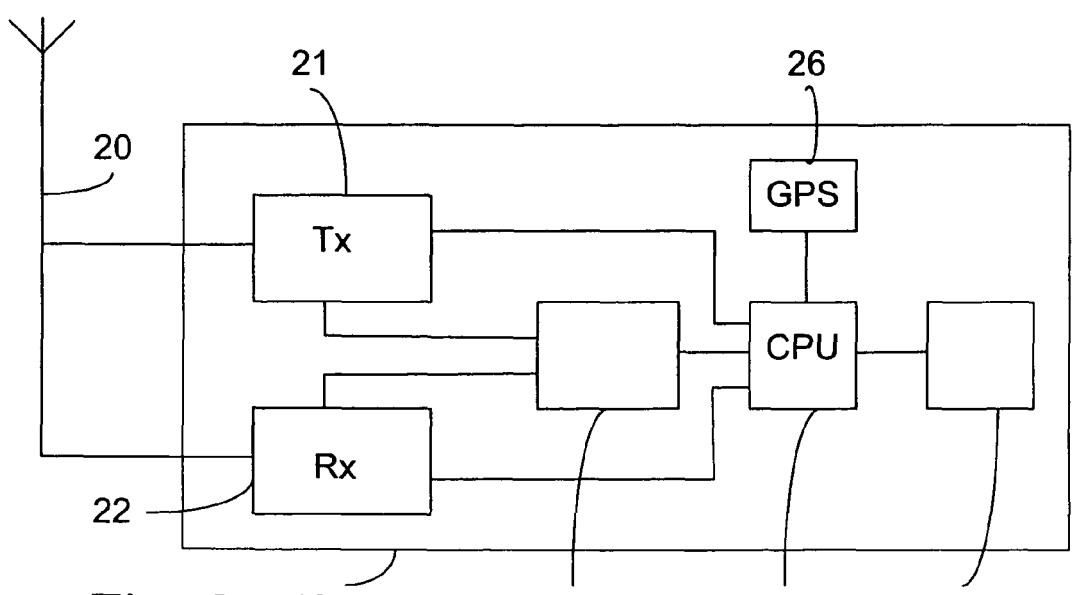
FIG. 2 is a schematic block diagram of an exemplifying UE.

A UE may be constructed as depicted in FIG. 2. The UE 18 comprises an antenna 20 for receiving and transmitting radio signals. The UE further comprises a transmitter 21, a receiver 22, a control unit 23, a CPU 24 and memory 25. Moreover, a GPS unit 26 may be included in the UE or being external and connected to the UE. The memory may be a RAM, a flash RAM, a hard disk, a ROM or any other known memory device or any combination.

The UE scans at regular intervals the radio environment in order to keep track of BSs having sufficient properties for communication. In order to save power, UE providers often program the UE in order to avoid measuring on the surrounding environment when not necessary. However, in a fairly new telecommunication network, such as 3G, the operators have not always succeeded to plan or tune their networks in an optimal way. This may result in the fact that the UE suddenly loses coverage. Since the UE providers may develop software that relies on good cell planning and prioritize low power consumption, at sudden cell loss, the user will not be able to use any services, in the worst case not even be able to set up emergency calls, until a search has been initiated and a new cell is found.

It is noted that the UE may lose communication to all BSs if the UE passes outside the cell coverage area of all BSs. The cell coverage areas may fail to cover certain geographic areas or the cell coverage may be degraded for different reasons, which may be temporary or more or less permanent. If coverage is lost, the user will e.g. not be able to receive incoming calls and may even lose the possibility of setting up emergency calls, which is non-desirable. Thus, there is a need for providing for fast and efficient recovery from lost coverage.

Suppose that a UE, which has good 3G FDD (frequency division duplex) coverage, suddenly loses its cell communication. Of any reason, such as poor cell planning or poor fine tuning of the broadcast network parameters, such as parameters that determine when the UE should start measuring 2G neighbors or neighboring frequencies, the UE may have no measurement information on the surrounding environment. Firstly now, the UE will start measuring neighboring frequencies, 2G neighbors, neighbors in other modes, all possible frequencies on FDD, all possible 2G frequencies etc, in any order, until it finds a new cell to camp on. During this time, the user cannot use the desired service. In the worst case, the UE cannot find a cell with "limited service" whereby not even emergency calls may be initiated. Because of the fact that many types of systems need to be searched, the search may take too long time, until the UE is back in service.

If the user passes such places with problems on a daily basis, the user may experience the situation annoying.

In order to remedy this situation, the UE is arranged to remember where the UE has experienced a problem such as loss of coverage. When the UE loses coverage, it stores the identity of the last cell together with the identity of the operator in a database in the memory of the UE. If the UE has knowledge of the exact position, in which coverage was lost, such position is also stored. Such position may be obtained by a GPS system or a Geometrix system in which three or more separate base stations measures the time difference of arrival and angle of arrival and calculates the position of the UE. The UE performs measurements on the different options, as indicated above, and finally finds a new cell to camp on. The UE will strive for the cell with highest priority, best service or best suited in another way. When such alternative and successful cells are found they are also added to the database.

Next time the UE enters a location or cell with previous problems, the UE will know what good options it has in order to obtain the best service. Moreover, the UE may be arranged to start a search for an alternative cell at en earlier time, if the UE enters a cell with a problematic history.

It may be that the problem is only temporary, such as a large truck shielding the UE, or that the network system has been upgraded so that the problem no longer occurs. In this situation, the cell problem information is removed by the system the next time the cell is entered and no problem is encountered. Another case when cell problem information should be removed is when the information is old, such as because the user only traveled this route once.

Figure 3:
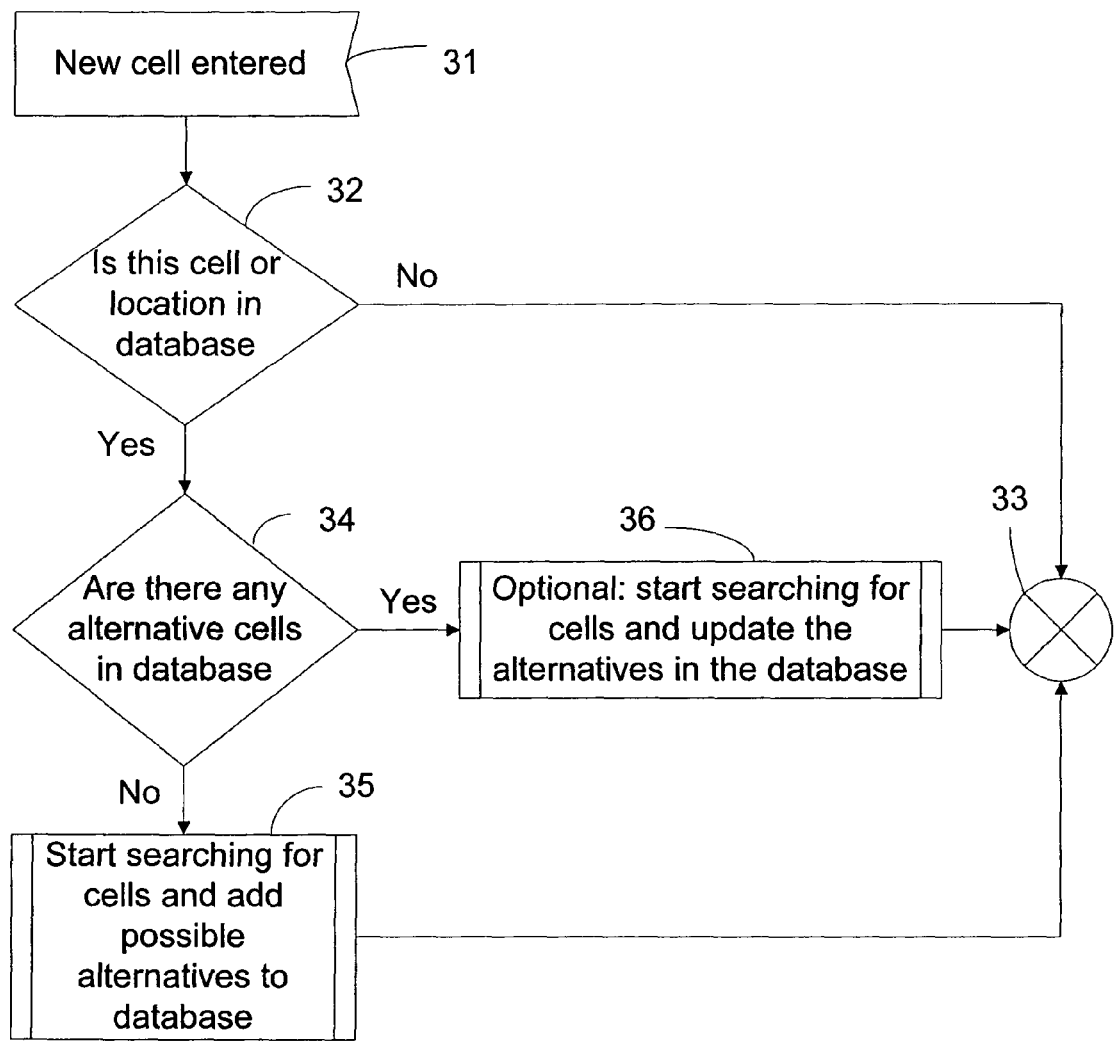
FIG. 3 is a flow chart of a method according to the invention, which is run once a cell, or a location within a cell, is entered.

FIG. 3 is a flow chart of a procedure in which the present invention is used. The procedure starts each time the UE enters a new cell coverage area of a new base station, as indicated by step 31. The UE performs a search in the memory or database and recovers information if the cell, or a location within the cell, has been entered in the database, as indicated in decision step 32. If the cell, or the location within the cell, is not in the database, there has been no previous problem, and the procedure proceeds in the normal way in step 33.

If there has been a previous problem the cell, or the location within the cell, has been entered in the database, and the procedure determines in step 34 if there are any alternative cells in the database to camp on if a problem occurs. If the answer is yes, the situation is satisfactory and the procedure may continue in the normal way in step 33. Optionally, a search may be started between, as shown in step 36, in order to update the alternatives. If the UE enters into problems, it will try to use the alternative cells in the database, which presumably will solve the situation.

If there are no alternative cells in the database, the procedure proceeds to step 35, in which a search is performed for alternative cells, which are added to the database. This search may be started earlier or be more thorough in one or several respects. If coverage is lost, there are now alternatives prepared in advance in case a loss of coverage is experienced, and the procedure proceeds in the normal way in step 33.

Figure 4:
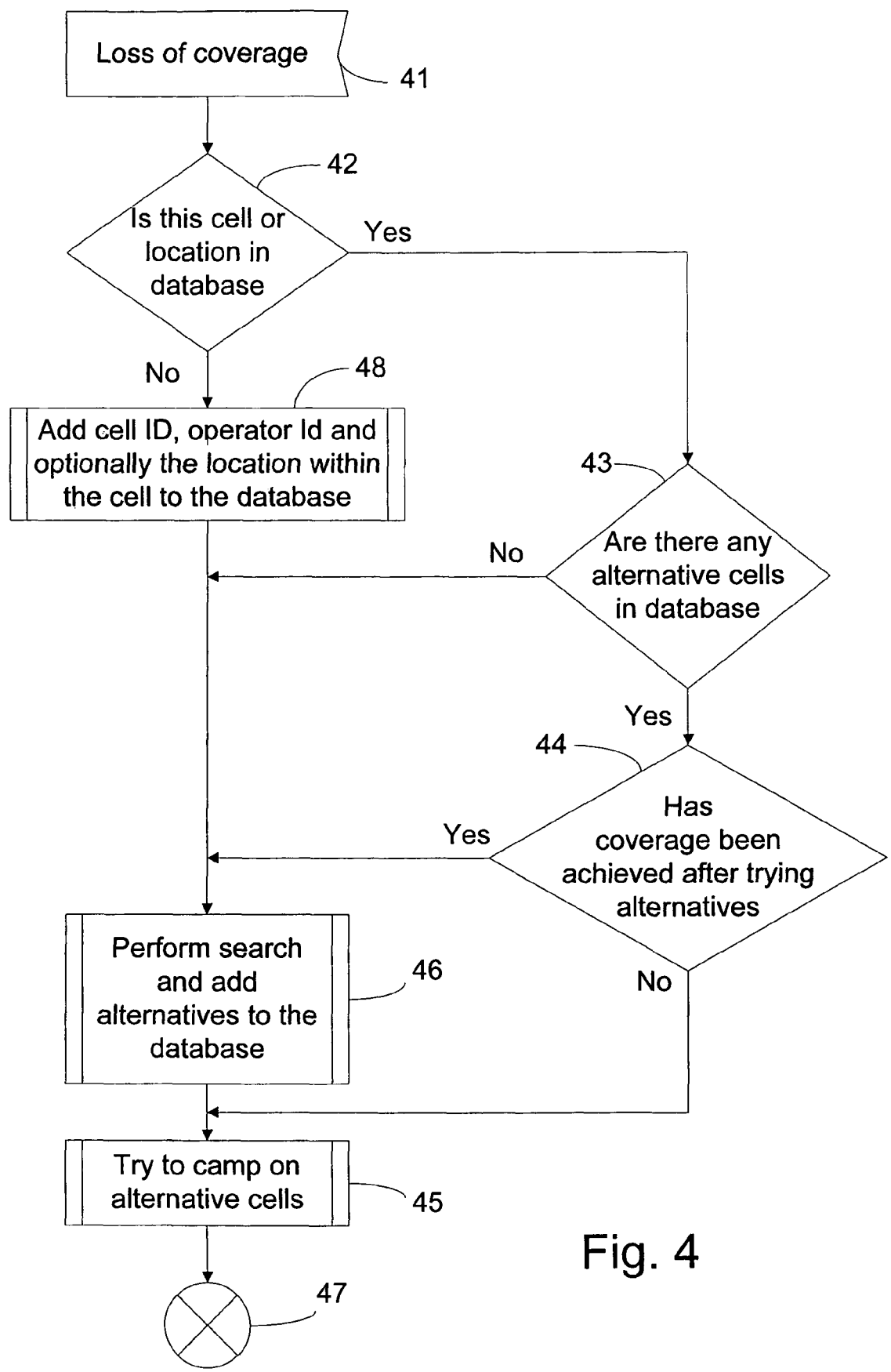
FIG. 4 is a flow chart of another method according to the invention, which is run when coverage is lost.

FIG. 4 is a flow chart of the procedure when a problem is present or imminent, such as the risk of loss of coverage as indicated in step 41.

When a problem is identified, as in step 41, the procedure determines in decision step 42 if there has been a problem previously in this cell or location within the cell. If there has been a previous problem, it may be that a solution has been stored in the memory, which is determined in step 43. If there are alternative cells stored in the memory of the UE for this specific cell or location within the cell, it is determined in the decision step 44 if coverage can be achieved after trying these alternatives. If this were the case, the UE attempts to camp on an alternative cell in step 45, which attempt normally would be positive.

If it is determined in step 44 that coverage has not been achieved after the alternatives were tested, the procedure proceeds to step 46 in which a new search is performed in order to add further alternatives to the database. When such alternative cells have been found, the procedure proceeds to step 45 in order to camp on such alternative cells.

If there were no alternative cells in the database in step 43, the procedure proceeds to step 46 in order to search for new alternatives.

When the UE has successfully camped on an alternative cell, the procedure ends in step 47. If the camping on an alternative cell was successful, such information is also stored in the memory for subsequent use in the decision step 44.

If a problem is identified in step 41 and it is determined in step 42 that the cell is not in the database, the following information is stored in the memory in step 48, namely: the cell identity, the operator identity, and the location within the cell if positioning information is available. Then, as soon as possible, a new search is performed for alternative cells in step 46 and such alternative cells are added to the memory.

Figure 5:
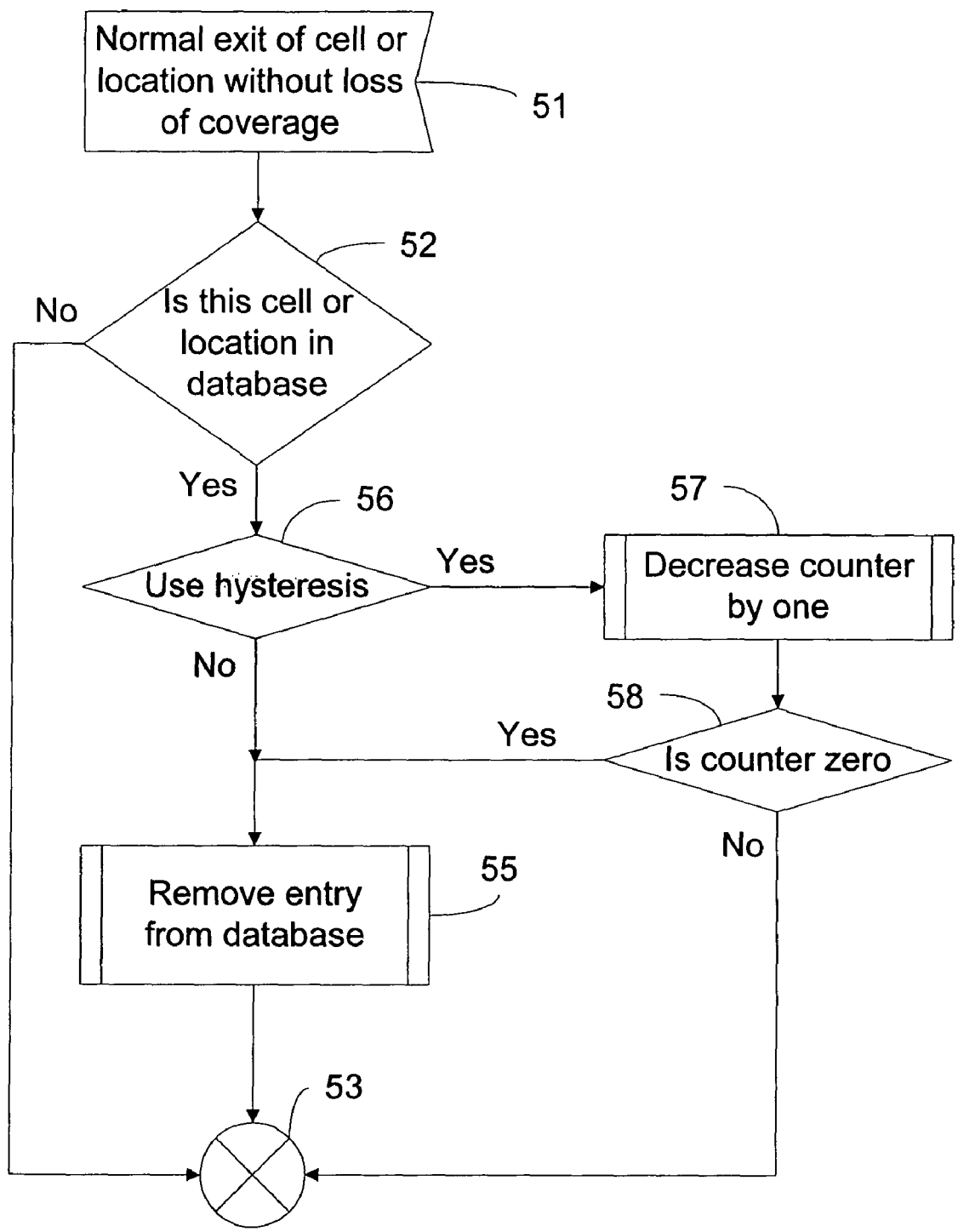
FIG. 5 is a flow chart of yet another method according to the invention, which is run when a cell, or a location within a cell, is exited without losing coverage.

FIG. 5 is a flow chart of the procedure when a cell is exited without a problem, as shown in step 51. In decision step 52 it is determined if the cell is in the database and has been susceptible to any problem. If that is not the situation, the procedure proceeds to the normal operation in step 53. However, if the exited cell is in the database and thus has had a problem, it is an indication that the previous problem may be of a temporary character or that the cause of the problem has been removed. In this case, the cell is removed from the list in the memory in step 55, and the procedure proceeds in the normal way in step 53.

In the procedure as shown in FIG. 5, it may be that the cell should not be removed in step 55, unless it had been unproblematic for a number of cell exits. This may be accomplished by using a hysteresis as determined in step 56, e.g. a counter, which is set to a predetermined number, such as five, when the cell is added to the list in step 48 (FIG. 4). The counter is then stepped down, as shown in step 57, each time the cell is exited in an unproblematic way, and if the counter becomes zero, as determined in step 58, the cell is removed in step 55. Similarly, the counter may be set to the predetermined number as soon as the cell is involved in the procedure of FIG. 4, indicating a problem.

Entries in the memory can also be removed if the cell is not involved in either of the procedures of FIG. 3, 4 or 5 for a week or a month. If the cell is not involved in any of these procedures, it may be an indication that the user does not pass this route any longer. In this case, the entry in the memory only takes up unnecessary space and may be removed in a housekeeping action.

If the user follows a route in which the signal strength is rather weak at certain locations, and if the user travels in a car, it may be of importance how the UE is arranged in the car. If the UE is put in a holder close to the windscreen of the car, the signal strength may be sufficient all the time. However, if the UE is placed in the pocket and is arranged low inside the car, the car may shield the signal so that the signal strength becomes to weak at certain locations. If this is the situation, the removal of the cell entry in the memory may take place only if the counter is stepped down several times. The user may preset the predetermined number.

If may be that a specific location is problematic only when passing the location by car, i.e. with a certain speed, while the same location is unproblematic when passing the location by foot, or in another direction.

By performing one or several of the above-mentioned procedures according to FIGS. 3, 4 and 5, the UE will be able to recover fast from a problematic condition (FIG. 4), to start the search for possible alternatives at an early time instance if a new cell is entered having a previous record of problems, but no problem has yet occurred (FIG. 3), and to remove entries in the memory (FIG. 5) which are no longer relevant.

The UE uses previous information in an intelligent way in order to predict a problem and obtain a fast solution, if the same route has been followed before. The UE remembers how the problem was solved the previous time and is ready in advance for this situation. In this way, the user does not need to wait for the UE to follow any traditional way of solving the problem in which the UE solely relies on network cell planning and parameters. Since the UE is storing information of the operator the UE is connected to, the operators will gain advantage of the present invention, since it will seem that they have planned the cells in a proper way and have good coverage. The user will not have any annoying spots on the daily routes where the UE may lose coverage.

The UE may report the problems to the base station and to any superstructure, so that the operators may be aware of the problems and may undertake appropriate action.

The information mentioned in step 48 may be stored in the UE, since the UE will need this information for recovery from a loss of coverage. However, the information may be transferred to a memory in the base station kept for each UE in communication with said base station, in which case also the identity of the UE is stored in the memory. The information may reside in the memory of only that base station. When the UE camps on a given base station, as indicated in FIG. 3, the base station can transmit the information in the memory of the base station relevant for exactly that UE, between step 31 and 32, and the procedure may continue as described above. In this way, the memory requirements in the UE can be decreased while the memory in the base station can be used instead.

The procedure according to FIG. 4 is entered if there is a problem, such as loss of coverage or loss of a call. The procedure may be entered also if there is an imminent problem, such as the fact that the signal strength is decreasing and the normal routines for handover do not provide a safe solution within some time, but before actual loss of coverage.

If the UE is provided with possibility of determining its position with a better resolution than the cell resolution, such as a GPS system, such information may be used in the procedures. In step 31 of FIG. 3, the step 31 may be entered only when the UE is close to a location in which a problem has previously been encountered, such as within an area of 50 m*50 m from such a location.

The user may also define a route often passed, during which the user wants the alternative procedure according to FIGS. 3 and 4 to be active, irrespectively of the fact that route has been passed several times without a problem. If this is the case, a further step is added to the procedure of FIG. 5, before step 55, in which it is determined if the UE is in a location where cell information should never be removed.

The UE may provide an alert, such as a beep, when the UE enters a problematic cell area or location, so that the user may end a call before it is possibly lost. Such a beep may be generated by the process of FIG. 3, if it is determined that the cell, or location, is in the database in step 32.

A user may adjust the memory size of the UE to suit the behavior of the user. For example, a user often traveling by train from A to B may experience repeated problems during such a travel and may need a lot of memory while a user traveling on a highway between C and D, may need much less memory.

The information may be stored in a database arranged in the memory of the UE. The database may be arranged in a specific manner adapted to the data to be stored. In this way, recovery of data from the memory may be fast. Alternatively, the information may be stored randomly in the memory and be retrieved by any suitable method.

The user equipment UE may be a portable or handheld mobile radio communication equipment, a mobile radio terminal, a mobile telephone, a pager, a communicator, an electronic organizer, a smartphone or a laptop computer.

The invention may be embodied in software or hardware or any combination thereof.

The invention has been described above with reference to several embodiments and alternatives. However, the alternatives or features may be combined in other combinations than specifically described above. The scope of the invention is only limited by the appended patent claims.

The invention claimed is:

1. A method of operating a user equipment intended to use a service in a wireless communication system having several base stations, comprising:
    monitoring, by said user equipment, a location of said user equipment;
    monitoring, by said user equipment, if a problem occurs or is imminent and storing information about the location of the user equipment at which said problem occurs in a memory of said user equipment;
    whenever a new area is entered, determining if any location within the area has been involved in a problem and information about alternative base stations, successful or not, is stored in the memory, wherein an alternative base station is deemed successful if the user equipment successfully camped on the alternative base station at an earlier time in response to the problem;
    in response to it being determined that any location within the area has been involved in a problem and also that information about alternative base stations, successful or not, is stored in the memory, starting a search for new alternative base stations before a problem occurs or is imminent, wherein the search is based on information about the alternative base stations stored in the memory, at exit from a base station, determining if a location covered by the base station has been involved in a problem and if the base station is not exited because of a problem; and
    in response to it being determined that a location covered by the base station has been involved in a problem and also that the base station is not exited because of the problem, removing the information about this base station in the memory in response to a determination that the location covered by the base station has been unproblematic for a predetermined number of exits.

2. The method of claim 1, further comprising:
    storing in said memory a base station identity and/or an operator identity when said problem occurs.

3. The method of claim 1, further comprising:
    searching for and storing in said memory at least one alternative base station for providing said service when a problem occurs or is imminent.

4. The method of claim 3, further comprising:
    trying to camp on a base station stored in said memory and storing in said memory information if the camp attempt was successful for alleviating the problem.

5. The method of claim 1, further comprising:
    when entering an area, retrieving information from the memory about any location within said area, which has been exposed to a problem.

6. The method of claim 5, further comprising:
    retrieving information from the memory whether there is no alternative base stations stored in the memory, and if there are no alternative base stations stored in the memory, performing a new search for alternative base stations.

7. The method of claim 1, wherein in response to it being determined that a location covered by the base station has been involved in a problem and also that the base station is not exited because of the problem, removing the information about this base station in the memory in response to a determination that the location covered by the base station has been unproblematic for a predetermined number of exits comprises:
    in response to it being determined that a location covered by the base station has been involved in a problem and also that the base station is not exited because of the problem, decreasing a counter, and if the counter is zero, removing the information about this base station in the memory.

8. The method of claim 7, further comprising setting the counter to a predetermined number when determining that the cell is problematic.

9. The method of claim 1, further comprising:
    in response to it being determined that a location has not been involved in a problem for a predetermined period of time, removing the information about this base station in the memory.

10. The method of claim 1, wherein said location is determined by a positioning system.

11. A non-transitory computer readable medium comprising program code, which when executed on a computer performs:
    monitoring, by said user equipment, a location of said user equipment;
    monitoring, by said user equipment, if a problem occurs or is imminent and storing information about the location of the user equipment at which said problem occurs in a memory of said user equipment;
    whenever a new area is entered, determining if any location within the area has been involved in a problem and information about alternative base stations, successful or not, is stored in the memory, wherein an alternative base station is deemed successful if the user equipment successfully camped on the alternative base station at an earlier time in response to the problem;

in response to it being determining that any location within the area has been involved in a problem and also that information about alternative base stations, successful or not, is stored in the memory, starting a search for new alternative base stations before a problem occurs or is imminent, wherein the search is based on information about the alternative base stations stored in the memory, at exit from a base station, determining if a location covered by the base station has been involved in a problem and if the base station is not exited because of a problem; and in response to it being determined that a location covered by the base station has been involved in a problem and also that the base station is not exited because of the problem, removing the information about this base station in the memory in response to a determination that the location covered by the base station has been unproblematic for a predetermined number of exits.

12. An apparatus included in a user equipment for operating said user equipment to use a service in a wireless communication system having several base stations, comprising:

a positioning unit, in said user equipment, for determining a location of said user equipment;

a memory, in said user equipment, for storing information about the location of the user equipment when a problem occurs or is imminent;

a control unit for determining, whenever a new area is entered, if any location within the area has been involved in a problem and information about alternative base stations, successful or not, is stored in the memory and for, in response to a determination that any location within the area has been involved in a problem and also that information about alternative base stations, successful or not, is stored in the memory, starting a search for new alternative base stations before a problem occurs or is imminent, wherein an alternative base station is deemed successful if the user equipment successfully camped on the alternative base station at an earlier time in response to the problem and wherein the search is based on information about the alternative base stations stored in the memory, wherein said control unit is adapted for determining, at exit from a base station, if a location covered by the base station has been involved in a problem and if the base station is not exited because of a problem; and in response to it being determined, at exit from a base station, that a location covered by the base station has been involved in a problem and also that the base station is not exited because of the problem, removing the information about this base station in the memory in response to a determination that the location covered by the base station has been unproblematic for a predetermined number of exits.

13. The apparatus of claim 12, wherein information is stored in said memory about a base station identity and/or an operator identity when said problem occurs.

14. The apparatus of claim 12, wherein information is searched for and stored in said memory about at least one alternative base station for providing said service when a problem occurs.

15. The apparatus of claim 14, wherein information is stored in said memory in response to a camp attempt being successful for alleviating the problem after trying to camp on a base station.

16. The apparatus of claim 12, wherein said control unit is adapted for retrieving information from the memory whether there is no alternative base stations stored in the memory, and in response to there being no alternative base stations stored in the memory, performing a new search for alternative base stations.

17. The apparatus of claim 12, wherein in response to it being determined that a location covered by the base station has been involved in a problem and also that the base station is not exited because of the problem, removing the information about this base station in the memory in response to a determination that the location covered by the base station has been unproblematic for a predetermined number of exits comprises:

in response to it being determined, at exit from a base station, that a location covered by the base station has been involved in a problem and also that the base station is not exited because of the problem, decreasing a counter, and if the counter is zero, removing the information about this base station in the memory.

18. The apparatus of claim 17, wherein said control unit is adapted for setting the counter to a predetermined number when it is determined that the cell is problematic.

19. The apparatus of claim 12, wherein said control unit is adapted for removing the information about this base station in the memory in response to a location not having been involved in a problem for a predetermined period of time.

20. The apparatus of 12, comprising a positioning system.

21. The method of claim 1, wherein:

in response to information about successful alternative base stations being stored in the memory, not starting a search, but using existing alternative base stations when a problem occurs.

22. The apparatus of claim 12, wherein said control unit is adapted for determining if information about successful alternative base stations is stored in the memory; and in response to it being determined that information about successful alternative base stations is stored in the memory, not starting a search, rather using existing alternative base stations when a problem occurs.

* * * * *

UNITED STATES PATENT AND TRADEMARK OFFICE
CERTIFICATE OF CORRECTION

| | |
|---|---|
| PATENT NO. | : 8,285,288 B2 |
| APPLICATION NO. | : 11/911000 |
| DATED | : October 9, 2012 |
| INVENTOR(S) | : Nader |

It is certified that error appears in the above-identified patent and that said Letters Patent is hereby corrected as shown below:

In Column 4, Line 41, delete "en" and insert -- an --, therefor.

In Column 6, Line 2, delete "FIG." and insert -- FIGS. --, therefor.

In Column 6, Line 15, delete "to" and insert -- too --, therefor.

Signed and Sealed this
Twenty-sixth Day of February, 2013

Teresa Stanek Rea
*Acting Director of the United States Patent and Trademark Office*